J. E. GROSJEAN.
BRAKE LINING.
APPLICATION FILED FEB. 4, 1918.
1,301,686.
Patented Apr. 22, 1919.
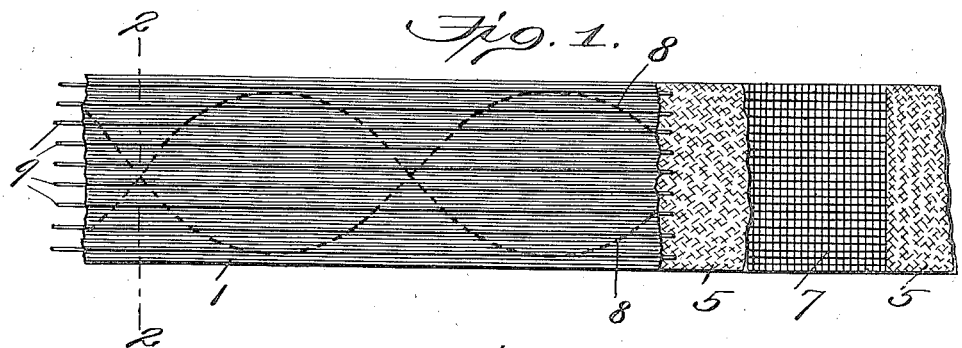
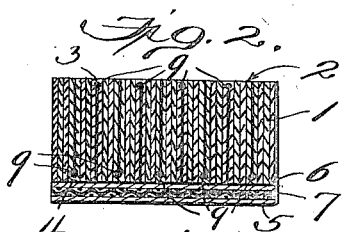
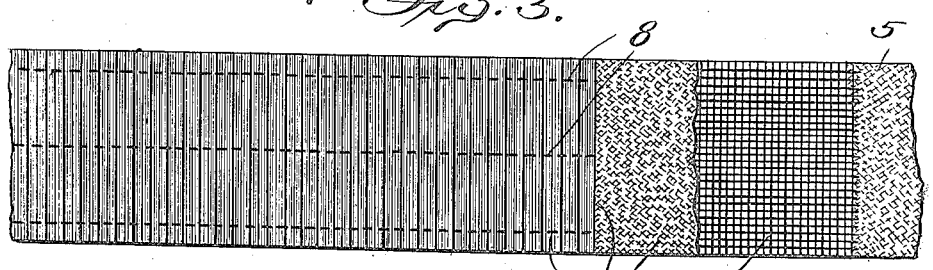
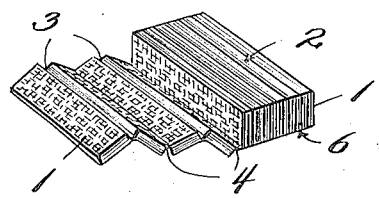
Inventor
James E. Grosjean
Witness
By
Attorney

UNITED STATES PATENT OFFICE.

JAMES E. GROSJEAN, OF LIMA, OHIO, ASSIGNOR OF ONE-HALF TO LEON F. MONTGOMERY, OF FORT RECOVERY, OHIO.

BRAKE-LINING.

1,301,686.  Specification of Letters Patent.  Patented Apr. 22, 1919.

Application filed February 4, 1918. Serial No. 215,352.

*To all whom it may concern:*

Be it known that I, JAMES E. GROSJEAN, a citizen of the United States, residing at Lima, in the county of Allen and State of Ohio, have invented new and useful Improvements in Brake-Linings, of which the following is a specification.

My present invention relates to improvements in linings or friction facings for brakes and the like, and more especially for band brakes of the kind used upon automobiles. The primary objects of the invention are to provide a novel and improved lining or facing of this class which can be manufactured inexpensively and with facility and which in use shall be durable and efficient and will not score or otherwise injure the brake drum.

To these and other ends, the invention consists in certain improvements, and combinations and arrangements of parts, all as will be hereinafter more fully described, the novel features being pointed out particularly in the claims at the end of the specification.

In the accompanying drawing:

Figure 1 is a face view with one end in section showing a friction facing or brake lining made in accordance with the present invention.

Fig. 2 represents a transverse section on the line 2—2 of Fig. 1.

Fig. 3 is a view similar to Fig. 1 showing another friction facing or brake lining also made in accordance with the present invention; and Fig. 4 is a detail perspective view showing diagrammatically the preferred mode of making up the facing or lining.

Similar parts are designated by the same reference characters in the several views.

The present invention provides a friction facing or brake lining capable of use generally where an efficient friction surface or face is desirable or necessary, it being particularly adapted for use upon band brakes of the type used on automobiles. The preferred embodiments of the invention are shown in the accompanying drawing and will be hereinafter described in detail, but it is to be understood that the invention is not restricted to the precise constructions shown, as equivalent constructions are contemplated and will be included within the scope of the claims.

The friction facing or brake lining is composed primarily of a suitable number of laminations 1, these laminations being assembled in flatwise relation and with their edges in alinement to form the friction or brake surface 2. Each lamination comprises a suitable number of plies of fabric, woven textile fabric, such as canvas, being preferred, and the plies of fabric comprising each lamination are preferably impregnated with rubber or rubber compound and are vulcanized together. An inexpensive source of supply from which the laminations may be made is afforded by old, worn, or discarded automobile outer casings. In making use of such casings for such purpose, the rubber or rubber compound is stripped off from the outer face of the fabric which is embedded in the casing, the plies of fabric as found in the casings being impregnated with rubber and vulcanized together. The beads are also trimmed off the fabric.

The laminations are made from the fabric so prepared preferably by scoring the fabric upon its opposite sides, the scorings on one side being midway between and alternating with the scorings on the opposite side of the fabric, and each scoring extends only partially through the fabric, leaving, for example, one ply of fabric uncut at each scoring. Fig. 4 shows a piece of multiple-ply fabric so prepared, the scorings 3 formed in one side thereof being midway between and alternating with the scorings 4 formed in the opposite side of the fabric. Assembling of the laminations is readily effected by folding the scored sections of the fabric in a flatwise relation, each fold being made in a direction opposite to the fold just preceding it. The assembled laminations may be united in different ways as, for example, by applying a rubber or other suitable cement between their flat faces, and after assembling of the laminations, the whole is preferably vulcanized to firmly unite the laminations. The structure thus produced from the laminations of fabric forms the friction face 2, the fabric plies comprising the laminations being presented edgewise, or substantially so, to this friction face. In consequence, the fibers composing the threads of the fabric plies are presented endwise to the friction face 2.

Preferably, a backing 5 is applied to the face 6 which is formed opposite to the friction face 2. This backing may be composed, for example, of a strip of woven fabric which is vulcanized, cemented, or otherwise affixed to the face 6. This backing 5 may also contain a woven wire mesh 7 to reinforce it. It is also preferable to bind together or unite the laminations by one or more lines of stitching. As shown in Fig. 1, two lines of stitching 8 are used, the stitches being made to pass through the structure formed by the laminations and also preferably through the backing when such is used, and the lines of stitching preferably run in reverse, zig-zag courses, while, in Fig. 3, three longitudinal lines of stitching are used. Lock stitches are preferably used. Obviously, the laminations may extend longitudinally of the facing or lining, as shown in Fig. 1, or, these laminations may extend transversely of the facing or lining as shown in Fig. 3. The friction facing or brake lining may be secured in place in any suitable way, such, for example, as by rivets which extend through the facing or lining. In applying the lining to the band brakes of automobiles, the lining may be easily fitted to the brake band, owing to the pliability of the lining, and it may be secured to the brake band by extending rivets through the lining and the brake band as practised with the usual linings. If desired or found necessary, a suitable number of wires may be laid in the folds of the laminations to retain the laminations more securely upon the backing strip, wires 9 being shown in Fig. 2 for this purpose, these wires extending continuously and longitudinally with the laminations.

A friction facing or brake lining made in accordance with the present invention can be manufactured inexpensively from materials which are usually discarded as waste, and, in use, they offer a high coefficient of friction which will substantially remain unaffected if the friction facing or lining becomes wet. The nature of the friction facing is such that it will not score or otherwise injure the brake drum or surface with which it coöperates and it will be durable by reason of the fact that the fibers of the threads of the fabric plies composing the laminations are presented endwise to the friction face. Furthermore, the edgewise presentation of the fabric plies to the friction face insures uniform wear of the lining and enables the lining to hold together when worn thin.

I claim as my invention:

1. A brake lining comprising a plurality of laminations of fabric assembled in flatwise relation and presented edgewise to form a friction face, and a flexible backing united to the face formed by the opposite edges of said laminations.

2. A brake lining comprising a plurality of laminations of rubber-impregnated fabric assembled and vulcanized together in flatwise relation and presented edgewise to form a friction face, and a flexible backing vulcanized to the face formed by the opposite edges of the laminations.

3. A brake lining comprising a plurality of laminations of fabric assembled in flatwise relation and presenting their edges to form a friction face, and a line of stitching extending through the laminations and running transversely of the laminations.

4. A brake lining comprising a plurality of laminations of fabric assembled in flatwise relation and presenting their edges to form a friction face, a flexible backing applied to the face formed by the opposite edges of the laminations, and a line of stitching extending through the laminations and the backing and running transversely of the laminations.

5. A brake lining comprising a plurality of laminations of fabric assembled in flatwise relation and presenting edges to form a friction face, and a backing of fabric united to the face formed by the opposite edges of the laminations, said backing having a wire reinforcement embedded therein.

6. A brake lining comprising a plurality of laminations of multiple-ply fabric formed from a sheet of multiple-ply fabric scored on opposite sides in alternating relation and folded together flatwise, the edges of the laminations being alined to form a friction face.

In testimony whereof I have hereunto set my hand in presence of two subscribing witnesses.

JAMES E. GROSJEAN.

Witnesses:
  CHAS. S. HYER,
  C. O. BATEMAN.